US011538017B2

United States Patent
Wallner

(10) Patent No.: US 11,538,017 B2
(45) Date of Patent: Dec. 27, 2022

(54) DETACHABLE ELECTRONIC PAYMENT DEVICE

(71) Applicant: Samsung Electronics Co., Ltd., Suwon-si (KR)

(72) Inventor: George Wallner, Miami Beach, FL (US)

(73) Assignee: Samsung Electronics Co., Ltd., Suwon-si (KR)

(*) Notice: Subject to any disclaimer, the term of this patent is extended or adjusted under 35 U.S.C. 154(b) by 109 days.

(21) Appl. No.: 17/063,967

(22) Filed: Oct. 6, 2020

(65) Prior Publication Data

US 2021/0019726 A1 Jan. 21, 2021

Related U.S. Application Data

(63) Continuation of application No. 15/046,819, filed on Feb. 18, 2016, now abandoned.
(Continued)

(51) Int. Cl.
*G06Q 20/32* (2012.01)
*G06Q 20/36* (2012.01)
(Continued)

(52) U.S. Cl.
CPC ....... *G06Q 20/327* (2013.01); *G06Q 20/3223* (2013.01); *G06Q 20/367* (2013.01); *G07F 7/0893* (2013.01)

(58) Field of Classification Search
None
See application file for complete search history.

(56) References Cited

U.S. PATENT DOCUMENTS 6,206,293 B1 * 3/2001 Gutman ........... G06K 19/07749
   235/441
7,114,652 B2 * 10/2006 Moullette ............. G07F 7/0833
   235/449
(Continued)

FOREIGN PATENT DOCUMENTS

CN    104050559 A    9/2014
JP    2004-280656 A  10/2004
(Continued)

OTHER PUBLICATIONS

Russian Office Action with English translation dated Aug. 13, 2018; Russian Appln No. 2016127525/08 (043105).
(Continued)

*Primary Examiner* — Christopher Bridges
*Assistant Examiner* — Tony P Kanaan
(74) *Attorney, Agent, or Firm* — Jefferson IP Law, LLP

(57) ABSTRACT

Detachable payment devices capable of performing payment transactions associated with a mobile wallet of a mobile device are described. The payment device may be implemented in a variety of shapes and sizes such as, the shape of a typical payment card or a stylus/electronic pen. In order to communicate with the mobile device, the mobile wallet of the mobile device, and a POS terminal, the detachable payment device may use short range contactless transmissions. While in a docked mode, the payment device may receive payment card data from a mobile wallet of the mobile device. Additionally, while docked, the payment device may transmit payment card data to a POS terminal's receiver, thereby acting as an integrated mobile payment unit with the mobile device. When in an undocked mode, the payment device may complete contactless payment transactions without assistance from the mobile device.

11 Claims, 4 Drawing Sheets

Related U.S. Application Data

(60) Provisional application No. 62/118,719, filed on Feb. 20, 2015.

(51) Int. Cl.
  *G06Q 20/20* (2012.01)
  *G06Q 20/38* (2012.01)
  *G07F 7/08* (2006.01)

(56) References Cited

U.S. PATENT DOCUMENTS

| | | | |
|---|---|---|---|
| 8,229,354 B2 | 7/2012 | Sklovsky et al. | |
| 8,628,012 B1* | 1/2014 | Wallner | G06K 7/08 |
| | | | 235/494 |
| 8,690,059 B1 | 4/2014 | Wallner | |
| 9,123,036 B2 | 9/2015 | Graylin et al. | |
| 9,412,105 B2 | 8/2016 | Graylin et al. | |
| 9,483,758 B2 | 11/2016 | Rhee et al. | |
| 9,733,735 B2* | 8/2017 | Jang | G06F 3/0486 |
| 10,909,565 B2* | 2/2021 | Collart | G06Q 20/3224 |
| 2007/0027804 A1* | 2/2007 | Vega | G06Q 20/401 |
| | | | 705/39 |
| 2008/0126260 A1* | 5/2008 | Cox | G06Q 20/3552 |
| | | | 705/67 |
| 2009/0247078 A1* | 10/2009 | Sklovsky | H04W 4/80 |
| | | | 455/41.1 |
| 2010/0148928 A1* | 6/2010 | Yeager | G07F 7/0806 |
| | | | 156/256 |
| 2013/0013490 A1* | 1/2013 | Keller | G06Q 20/353 |
| | | | 705/39 |
| 2013/0124346 A1* | 5/2013 | Baldwin | G06Q 20/4015 |
| | | | 705/16 |
| 2013/0146659 A1* | 6/2013 | Zhou | G06Q 20/321 |
| | | | 235/380 |
| 2013/0179352 A1* | 7/2013 | Dwyre | G06Q 20/401 |
| | | | 705/71 |
| 2013/0226815 A1* | 8/2013 | Ibasco | H04W 12/033 |
| | | | 705/64 |
| 2013/0256397 A1* | 10/2013 | Brown | G06Q 20/322 |
| | | | 235/375 |
| 2013/0264234 A1* | 10/2013 | Cohen | G06Q 20/3226 |
| | | | 206/320 |
| 2013/0332354 A1* | 12/2013 | Rhee | G06Q 20/322 |
| | | | 705/41 |
| 2014/0246490 A1* | 9/2014 | Graylin | G06Q 20/326 |
| | | | 235/379 |
| 2014/0249948 A1* | 9/2014 | Graylin | G06Q 20/326 |
| | | | 705/21 |
| 2014/0279437 A1* | 9/2014 | Lee | G06Q 20/227 |
| | | | 705/39 |
| 2014/0279546 A1* | 9/2014 | Poole | G06Q 30/06 |
| | | | 705/44 |
| 2015/0302393 A1* | 10/2015 | Poole | H04L 63/0861 |
| | | | 705/65 |
| 2015/0324788 A1 | 11/2015 | Graylin et al. | |
| 2016/0086166 A1* | 3/2016 | Pomeroy | G06Q 20/36 |
| | | | 705/40 |
| 2016/0328708 A1 | 11/2016 | Ibasco et al. | |
| 2017/0039548 A1 | 2/2017 | Rhee et al. | |
| 2017/0330188 A1* | 11/2017 | Canh | G06Q 20/385 |
| 2017/0337542 A1* | 11/2017 | Kim | G06Q 20/227 |

FOREIGN PATENT DOCUMENTS

| | | |
|---|---|---|
| JP | 2004-295902 A | 10/2004 |
| JP | 2010-186408 A | 8/2010 |
| JP | 2013-257878 A | 12/2013 |
| RU | 117 210 U1 | 6/2012 |
| RU | 2 489 813 C2 | 8/2013 |

OTHER PUBLICATIONS

Japanese Office Action dated Aug. 21, 2018; Japanese Appln. No. 2016-548123.
Korean Office Action with English translation dated Oct. 22, 2018; Korean Appln. No. 10-2018-7004123.
Chinese Office Action with English translation dated Mar. 25, 2019; Chinese Appln. No. 201680000815.7.
Korean Intellectual Property Office Notice of Preliminary Rejection for Application No. 10-2016-7023058, dated Jun. 25, 2017.
Brazilian Office Action with English translation dated Aug. 3, 2020, Brazil Appln. No. BR112016015388-0.

* cited by examiner

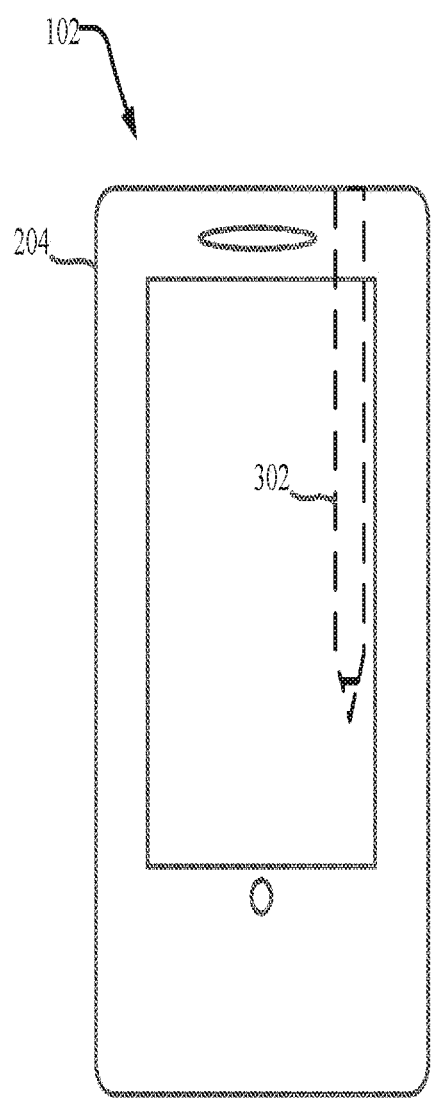
FIG. 3A
FIG. 3B

DETACHABLE ELECTRONIC PAYMENT DEVICE

CROSS-REFERENCE TO RELATED APPLICATION DATA

This application is a continuation application of prior application Ser. No. 15/046,819, filed on Feb. 18, 2016, which claims priority to U.S. Provisional Patent Application Ser. No. 62/118,719, filed on Feb. 20, 2015, which is incorporated herein by reference in its entirety.

FIELD OF TECHNOLOGY

The present disclosure relates generally to electronic payment devices, and more particularly to electronic devices that utilize mobile wallets.

BACKGROUND

Mobile wallets are increasingly replacing physical payment cards. Mobile wallets, applications, and related contactless transmission hardware installed on mobile phones and tablets provide means for consumers to store electronic equivalents of debit and credit cards and use them to make point-of-sale (POS) contactless payments by holding the mobile device near a POS terminal.

Mobile wallets and mobile payments have many advantages over traditional payment cards. However, mobile phones and tablets are very personal devices that lack the casual portability aspect of payment cards. Although, mobile wallets are easy to use at retail locations equipped with consumer facing payment card accepting POS terminals, or where such terminals are within arm's reach of the consumer, mobile phones and tablets, being very personal devices, are less suitable for being handed over to establishment employees in place of a payment card.

SUMMARY

The present disclosure generally provides payment devices that are detachable from a mobile device and that are also configured to perform payment transactions associated with a mobile wallet of the mobile device. The detachable payment device may be implemented in the shape of a typical payment card (i.e., rectangular) or a stylus/electronic pen, for example. In order to communicate with the mobile device, the mobile wallet of the mobile device, and a POS terminal, the detachable payment device may use short range contactless transmissions such as, for example, Bluetooth, near-field communications (NFC), or magnetic secure transmissions (MST).

The payment device may have a docked mode and an undocked, and a contactless transmission mode. For example, while in the docked mode, the payment device may receive payment card data from a mobile wallet of the mobile device to which it is docked. Additionally, while docked, the payment device may transmit payment card data to a POS terminal's receiver, thereby acting as an integrated mobile payment unit with the mobile device. When undocked/detached, the payment device may operate independently from the mobile device and complete contactless payment transactions without the need of assistance from the mobile device. Yet, however, while detached, operations of the payment device may be supplemented by a wireless connection between the payment device and the mobile device.

BRIEF DESCRIPTION OF THE DRAWINGS

Embodiments of devices, systems, and methods are illustrated in the figures of the accompanying drawings, which are meant to be exemplary and non-limiting, in which like references are intended to refer to like or corresponding parts, and in which:

FIG. 3A is a front view of the mobile device including a detachable payment device according to another embodiment of the present disclosure;

FIG. 3B is the detachable payment device implementable in accordance with FIG. 3A according to the present disclosure.

DETAILED DESCRIPTION

Figure 1:
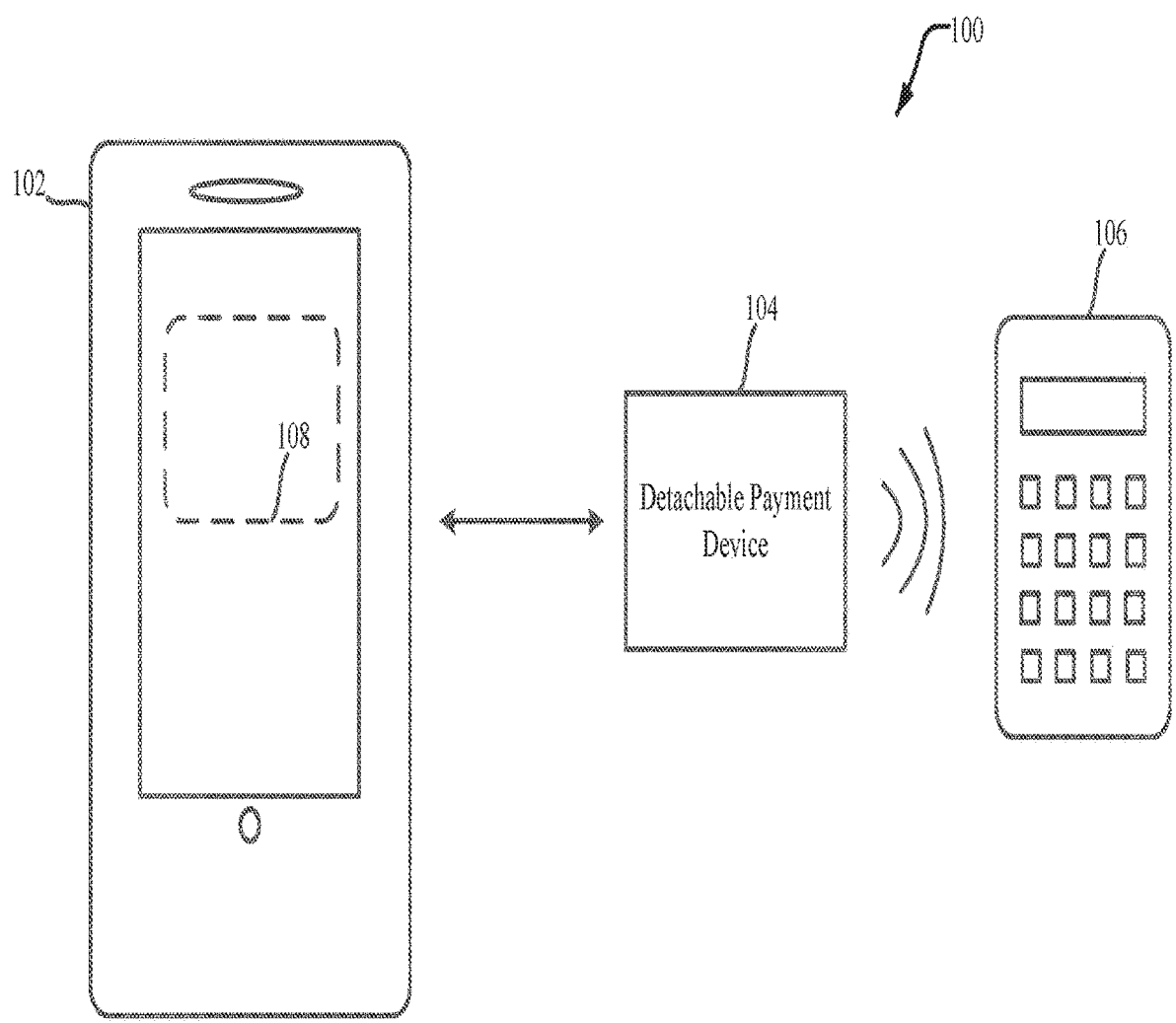
FIG. 1 illustrates a system for performing mobile wallet transactions using a detachable payment device according to the present disclosure.

The detailed description of the present disclosure set forth herein makes reference to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description herein is presented for purposes of illustration only and not of limitation. For example, the steps recited in any of the method or process descriptions may be executed in an order other than as presented and are not limited to the order presented. Moreover, references to a singular embodiment may include plural embodiments, and references to more than one component may include a singular embodiment.

The present disclosure generally relates to payment devices, detachable from a mobile device, that are capable of performing payment transactions associated with a mobile wallet of the mobile device or a mobile wallet stored in the detachable device. An example of use of a mobile wallet application and a mobile wallet system is described in U.S. Pat. No. 9,022,285, entitled System and Method for Securely Loading, Storing and Transmitting Magnetic Stripe Data in a Device Working with a Mobile Wallet System, which is incorporated by reference herein in its entirety. The detachable payment device may be implemented in a variety of shapes and sizes such as, for example, the shape of a typical payment card (i.e., rectangular), a fob or a stylus/electronic pen. In order to communicate with the mobile device, the mobile wallet of the mobile device, and a POS terminal, the detachable payment device may use short range contactless transmissions such as, for example, Bluetooth, near-field communications (NFC), or magnetic secure transmissions (MST).

While in a docked mode, the payment device may receive payment card data from a mobile wallet of the mobile device, and may transmit payment card data to a POS terminal's receiver, thereby acting as an integrated mobile payment unit with the mobile device. When in an undocked mode, the payment device may complete contactless payment transactions without assistance from the mobile device.

A mobile wallet is a software module or hardware implemented within a mobile device (e.g., a smart phone, smart watch, or tablet) that enables a user of the mobile device to perform credit/debit payment transactions using digital forms of credit and credit/debit cards electronically stored in the mobile wallet. A mobile wallet may be used to make in-store purchases, and electronic purchases through software applications on a mobile device. A mobile wallet securely stores information relating to payment cards or tokens, containing information such as card number, expiration date, name on the card, type of card, issuer of card, card verification value (CVV) number, or some other cryptographic authentication element, etc. An example of use of a mobile wallet application and securing information relating to payment cards or tokens in a mobile wallet system is described in U.S. Patent Publication US 2015/0363771, entitled Mobile Checkout Systems and Methods, which is incorporated by reference herein in its entirety.

To perform a typical mobile wallet transaction, the mobile device is positioned within a threshold distance of a POS device, with the threshold distance being measured by the short range wireless transmission capabilities of the mobile device and/or the POS device. In addition, some mobile wallet transactions require a user verify they are the owner of the transacted card by supplying a fingerprint or some other personal identifying information to the mobile device.

Since mobile wallet transactions utilize short range wireless transmissions to communicate data, the mobile device, in many transactions, must be handed to a business establishment's employee when the POS device is inaccessible to the mobile device's user. This is unsatisfactory at least because mobile devices are highly personal, and people typically do not like handing highly personal items to strangers. It is against this backdrop that the present disclosure provides detachable payment devices that can be used to perform mobile wallet transactions, thereby eliminating the need to hand over to business employees the mobile payment device. Rather, only the detachable payment device is handed over.

FIG. 1 illustrates a system 100 for performing mobile wallet transactions using a detachable payment device according to the present disclosure. The system 100 includes a mobile device 102, a detachable payment device 104, and a point-of-sale (POS) device 106. Examples of the payment device 104 are presented herein below as 104a and 104b in FIGS. 2A-2B and FIGS. 3A-3B, respectively.

The mobile device 102 includes a mobile wallet 108. The mobile wallet 108, which may be implemented in the mobile device 102 as hardware or software, stores payment card data usable in contactless payment transactions. The mobile device 102 may be a smart phone, smart watch, tablet, or like mobile device capable of including and operating a mobile wallet.

The payment device 104 detachably couples to the mobile device 102 as described herein below. The payment device 104 may communicate with the mobile device 102 via physical means such as a set of physical contacts. For example, when docked to the mobile device 102, the payment device 104 may draw power from the mobile device 102 via physical, electrical contacts, thereby replenishing an internal power source of the payment device 104. The payment device 104 may also communicate with the mobile device 102 via Bluetooth or other like wireless communications/connections. For example, when docked to the mobile device 102, the payment device 104 may receive payment card data from the mobile wallet 108 of the mobile device 102.

The detachable payment device 104 includes contactless payment transmission hardware or software, which is used to transmit payment card data associated with the mobile wallet 108 to the POS terminal/device 106. Contactless transmissions usable by the payment device 104 to communicate with the POS device 106 include, for example, near-field communication (NFC), magnetic secure transmission (MST), or like short range contactless transmissions that the POS device 106 is able to recognize and receive.

The detachable payment device 104 may have a docked mode and a detached mode, with each mode enabling distinct processes/functions performable by the payment device 104. For example, the docked mode may enable the payment device 104 to receive power from the mobile device 102, thereby replenishing an internal power source/battery of the payment device 104. The power communicated to the payment device 104 may be transmitted via physical contacts that electrically connect the payment device 104 to the mobile device 102, or receive battery charging power from the mobile device it is docked to. Moreover, the docked mode may enable the payment device 104 to operate as an integrated mobile payment unit with the mobile device 102. That is, when the payment device 104 is docked, payment card data of the mobile wallet 108 may be transmitted, via short range contactless transmissions, to the POS device 106 by both the payment device 104 and the mobile device 102.

The detached mode may enable the payment device 104 to operate independently from the mobile device 102 (i.e., the payment device 104 may complete a contactless payment transaction with the POS device 106 without assistance from the mobile device 102). However, it should be appreciated that the detached mode does not need to limit the payment device 104 as such. For example, while the detached mode is enabled, the payment device 104 may complete/perform transactions while being supplemented by the mobile device 102 through, e.g., Bluetooth or other like wireless communications/connections.

The mobile device can be used in two distinct modes. In one mode, the wallet resides on the mobile device and the detachable device is only an extension of that wallet. All major functions, such card storage, provisioning (including most security) are performed in the mobile device. In another mode, the mobile wallet resides in the detachable device and the mobile device (and the wallet application running on it, are used to control and manage the detachable device and to provide connectivity to wide area networks (phone network, WiFI, etc.) and the Internet.

The detachable payment device 104 may be configured to transmit payment card data to the POS device 106 automatically (e.g., transmit payment card data once the payment device 104 is located within a certain proximity of the POS device 106). The proximity may be dictated by the wireless transmission and reception capabilities of the payment device 104 and/or POS device 106. the detachable payment device 104 may be configured to transmit payment card data upon a trigger event occurring. For example, payment card data may be transmitted after or when a user interacts with a button on the payment device 104. In another example, payment card data may be transmitted after or when a user interacts with a fingerprint scanner on the payment device 104. In a further example, payment card data may be transmitted in response to a remote command (e.g., interaction with a button or fingerprint scanner) originating from the mobile device 102. The triggering event used to activate transmission of payment card data from the payment device 104 may depend on implementation. For example, more than one triggering event may be used in situations where more security/encryption of payment card data is desired.

Figure 2A:
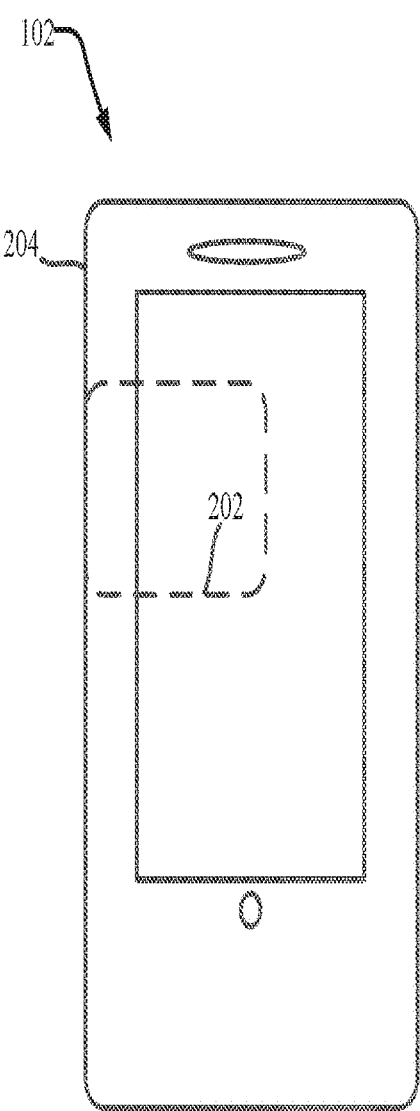
FIG. 2A is a front view of a mobile device including a detachable payment device according to an embodiment of the present disclosure.
Figure 2B:
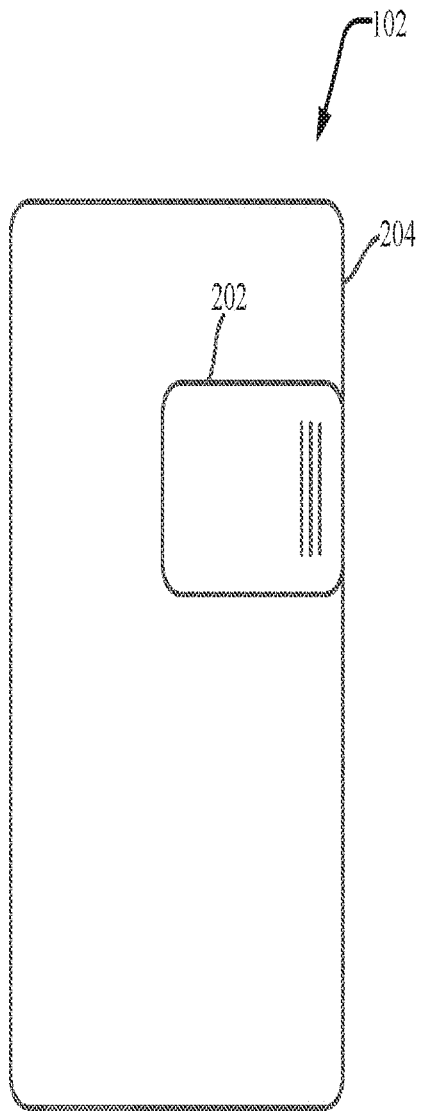
FIG. 2B is a rear view of the mobile device including the detachable payment device of FIG. 2A according to the present disclosure.

FIGS. 2A and 2B illustrate the mobile device 102 with a payment card shaped, i.e. rectangular, detachable payment device 104a according to the present disclosure. The mobile device 102 includes a housing 204, which may contain a recess (not illustrated) into which the payment device 104a may be docked. Alternatively, the payment device 104a may dock to the mobile device 102 at a non-recessed part of the housing 204 using for example, magnetic, physical, and other like attachment means.

The payment device 104a may dock on the mobile device 102 anywhere that enables the payment device 104a to receive charge and payment card data as described herein. For example, the payment device 104a may dock to a top, middle, or bottom portion of the mobile device 102. Moreover, the payment device 104a may dock to or near a side edge, middle of (i.e., away from an edge of the mobile device 102), or top or bottom edge of the mobile device 102. Additionally, while it is illustrated that the payment device 104a may dock to a back/rear side of the mobile device 102, one skilled in the art should appreciate that the payment device 104a may dock to a front side or an edge of the mobile device 102 without departing from the scope of the present disclosure.

FIGS. 3A and 3B illustrate the mobile device 102 with a stylus shaped detachable payment device 104b according to the present disclosure. The payment device 104b may merely take the form of a stylus without being configured to perform traditional stylus functions. Alternatively, the payment device 104b may take the form of a stylus, perform traditional stylus functions, and perform payment functions as described herein.

Like the payment device 104a, the payment device 104b is configured to detachably dock to the mobile device 102. The payment device 104b may dock within a recess of the mobile device 102. Alternatively, the payment device 104b may dock to the mobile device 102 in a non-recessed part of the housing 204 using magnetic or other like attachment means. The payment device 104b may dock on the mobile device 102 anywhere that enables the payment device 104b to receive charge and payment card data as described herein. For example, the payment device 104b may dock to a top, middle, or bottom portion of the mobile device 102. Moreover, the payment device 104b may dock to or near a side edge, middle of (i.e., away from an edge of the mobile device 102), or top or bottom edge of the mobile device 102. Additionally, while it is illustrated that the payment device 104b may dock to a back/rear side of the mobile device 102, one skilled in the art should appreciate that the payment device 104b may dock to a front side or an edge of the mobile device 102 without departing from the scope of the present disclosure.

While the detachable payment device 104 (also 104a and 104b) has been described as attachable to the mobile device 102, it should be appreciated that the payment device 104 may be a stand-alone device (i.e., not physically attachable to the mobile device 102). When the payment device 104 is a stand-alone device, it may have its own independent power source. Moreover, when stand-alone, the payment device 104 may maintain communications with the mobile wallet 108 via Bluetooth or other wireless communications/connections.

Additionally, the detachable payment device 104 (also 104a and 104b) may be configured to communicate with the mobile device 102 and the mobile wallet 108 via wired communication/connections. In such implementations, the wired communication/connections may be permanently coupled to the mobile device 102 and/or the payment device 104. In addition or alternatively, the wired communication/connection means may be removably coupled to the mobile device 102 and/or the payment device 104.

The detachable payment device 104 may be equipped to provide usage and location reporting and commands to and from the mobile device 102 and the mobile wallet 108 through Bluetooth, other like wireless communications, or wired communications. For example, usage reporting may result when and provide an indication that a waiter just pushed the PAY button. Location reporting may include data such as continent of transaction, state of transaction, county of transaction, city of transaction, establishment of transaction, and the like information that may be available as a function of GPS capabilities available to the mobile device. Commands to and from the mobile device may include which card was activated, if NFC is effected, the transaction amount, etc. Such commands and reports may include usage reports, location alerts, and alarms.

The detachable payment device 104 (also 104a and 104b) may contain its own memory and cryptographic processor device(s) and store payment card information and use such payment card information to make contactless payments independently of the mobile device 102 and mobile wallet 108, for example, when outside the range of their Bluetooth or other wireless communications means, or when the mobile device 102 is switched off or is inoperative. The payment card information or credentials stored and transmitted by the payment device 104 may consist of static card data, such as card data stored on the magnetic stripe of a magnetic stripe card or chip card. The payment card information or credentials may also consist of static card data with a dynamic element, such as a dynamic CVV. Additionally, the payment card information or credentials may be fully or partially tokenized card data, with or without a dynamic cryptogram. Such credentials can be either preloaded into the mobile device 102 via the mobile wallet 108, or can be locally generated based on keys and other data loaded via the mobile wallet 108.

Moreover, the detachable payment device 104 (also 104a and 104b) may contain a set of communications contacts, such as a USB connector, and may be used to deliver payment card data or tokens to a consumer device, such as a laptop computer or tablet, to enable secure e-commerce payments.

The detachable payment device 104 (also 104a and 104b) may also be used as a secure storage of payment cards, credentials, tokens, and keys, which the payment device 104 makes available to the mobile wallet 108 of the mobile device 102 on demand. For example, the detachable device—which contains the wallet and the keys—could be used to generate tokenized card data for Internet commerce, where the card data would be given to the user via the display of the mobile device.

Figure 4:
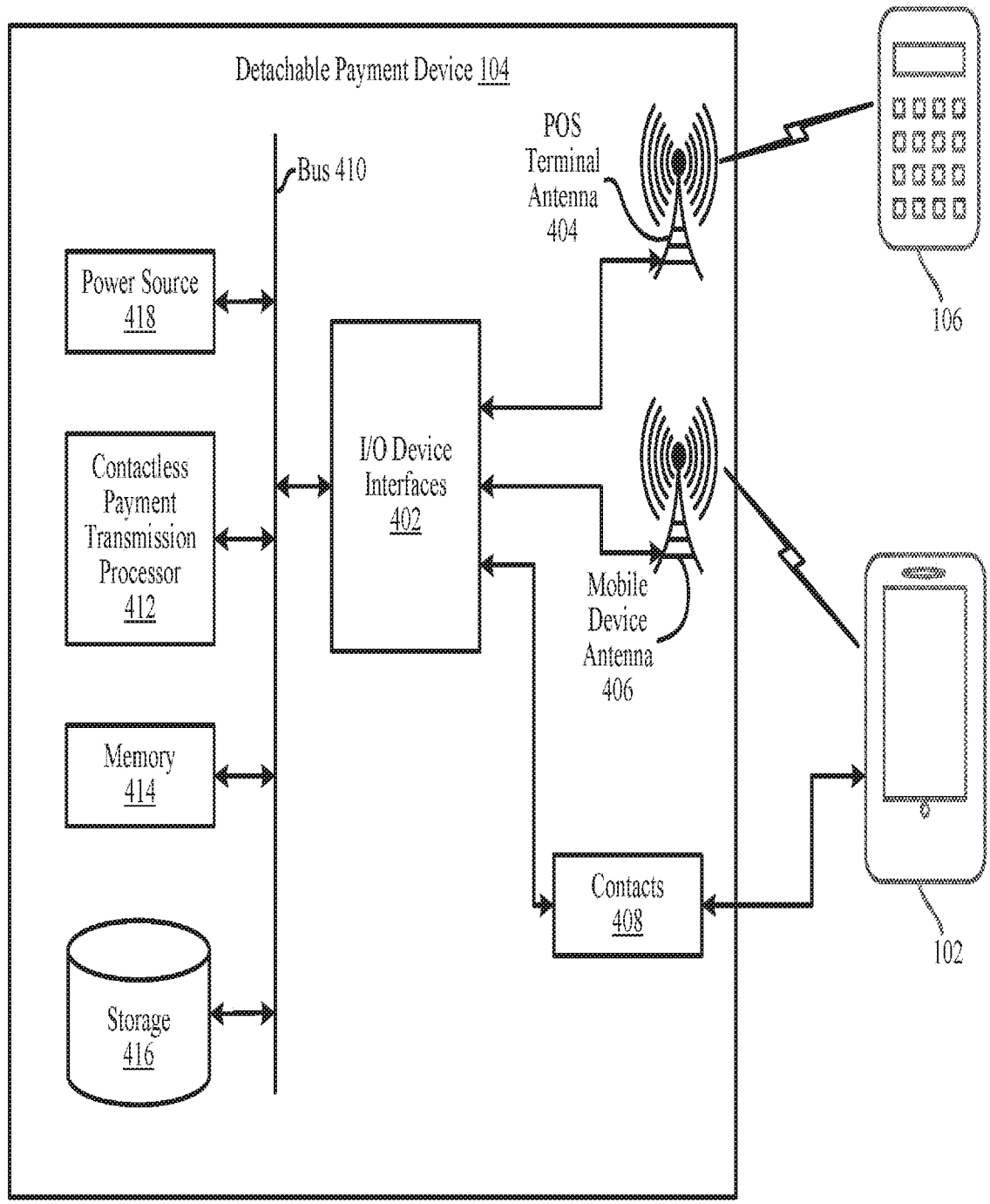
FIG. 4 illustrates example components of the detachable payment device according to the present disclosure.

FIG. 4 illustrates example components of the payment device 104 (which also represents payment devices 104a and 104b). In operation, the payment device 104 may include computer-readable and computer-executable instructions that reside on the payment device 104, as will be discussed further below.

As illustrated in FIG. 4, the payment device 104 includes input/output (I/O) device interfaces 402, which provide the payment device 104 with connectivity and protocol support. For example, a POS terminal antenna 404 may be used to provide connectivity between the payment device 104 and the POS terminal/device 106. The same antenna 404 or a separate mobile device antenna 406 may be used to provide connectivity between the payment device 104 and the mobile device 102. Additionally, physical contacts 408 may be used to provide physical connectivity between the payment device 104 and the mobile device 102. The contacts 408 may be configured to couple directly to electrical contacts of the mobile device 102, or may be configured to indirectly couple to the mobile device 102 via an external peripheral device connection such as universal serial bus (USB), FireWire, Thunderbolt, or other wired connection protocol.

As described, a variety of protocols may be supported by the I/O device interfaces 402 for the antennae 404, 406. For example, the antennae 404, 406 may emit and receive Bluetooth, WiFi Direct, or NFC transmissions. In the alternative, instead of using a radio frequency (RF), the antennae 404, 406 may be based on other technology, such as ultrasonic communication or infrared communication.

The payment device 104 may include an address/data bus 410 for conveying data among components of the payment device 104. Each component within the payment device 104 may also be directly connected to other components in addition to (or instead of) being connected to other components across the bus 410.

The payment device 104 may include a contactless payment transmission processor 412, which may include a central processing unit (CPU) for processing data and computer-readable instructions that enable the payment device 104 to perform mobile wallet transactions as described herein. The payment device 104 may also include a memory 414 for storing data (e.g., payment card data) and instructions. The memory 414 may include volatile random access memory (RAM), non-volatile read only memory (ROM), non-volatile magnetoresistive (MRAM) and/or other types of memory. The payment device 104 may also include a data storage component 416, for storing data (e.g., payment card data) and controller/processor-executable instructions (e.g., instructions to perform the processes performed by the payment device 104 as described herein). The data storage component 416 may include one or more non-volatile storage types such as magnetic storage, optical storage, solid-state storage, etc.

The detachable payment device 104 further includes a power source 418. The power source 418 may be a lithium ion battery or other like battery capable of being recharged.

In operation, communications are transmitted between the mobile device 102, detachable payment device 104, and POS device 106 when performing mobile wallet transactions. The mobile device 102 may send a command to the detachable payment device 104 instructing it to transmit a particular card data sequence. The command may include just the card ID (when the wallet resides in the detachable device) or it may include the entire card sequence, including authentication parameters. Communications between the mobile device 102 and the detachable payment device 104 are encrypted. Additionally, the detachable payment device 104 is cryptographically bound to the mobile device 102 and the wallet account residing on the mobile device, as well as to its corresponding account. Other communications may include card provisioning, card removal and card specific key updates.

Various applications of the disclosed techniques provide substantial improvements to the functioning of computing apparatuses that implement mobile wallets and the technical environments in which the various applications are implemented. Moreover, although the present disclosure has been described herein with reference to the accompanying drawings, it is to be understood that the present disclosure is not limited to those precise teachings, and that various other changes and modifications may be made by one skilled in the art without departing from the spirit and scope of the present disclosure.

What is claimed is:

1. A detachable electronic pen device, comprising:
  a battery;
  a button configured to receive a user input;
  a wireless communication circuit;
  a memory storing payment card data associated with a mobile wallet of a mobile device, the payment card data including at least partially tokenized data; and
  at least one processor configured to:
    enable a docked mode when the detachable electronic pen device is physically coupled to the mobile device,
    receive, in the docked mode, the payment card data from the mobile device,
    charge, in the docked mode, the battery using power received from the mobile device,
    transmit, in the docked mode, the payment card data to a point-of-sale (POS) along with the mobile device to perform a transaction,
    enable a detached mode when the detachable electronic pen device is physically detached from the mobile device,
  wherein the at least one processor, in the detached mode, is further configured to:
    transmit, in response to an interaction with the button, the payment card data directly to the POS device via the wireless communication circuit, to perform a transaction in the detached mode, and
    transmit, in response to the transmitting of the payment card data to the POS device, location reporting and usage information indicating that the transaction is performed by the detachable electronic pen device, to the mobile device through the wireless communication in the detached mode,
    and
  wherein the location reporting includes a continent of the transaction, a state of the transaction, a county of the transaction, and/or a city of the transaction.

2. The detachable electronic pen device of claim 1, wherein the payment card data includes at least one of static card data, static card data having a dynamic element, or at least partially tokenized data having a dynamic cryptogram.

3. The detachable electronic pen device of claim 1, wherein the wireless communication circuit is configured to perform short range wireless transmission using at least one of a Bluetooth communication protocol, a near-field communication (NFC) protocol, a magnetic secure transmission (MST) protocol, or a Wi-Fi Direct protocol.

4. The detachable electronic pen device of claim 1, further comprising a fingerprint scanner,
  wherein the transmitting of the payment card data directly to the POS device via the wireless communication circuit is additionally in response to a user interaction with the fingerprint scanner.

5. The detachable electronic pen device of claim 1, wherein the detachable electronic pen device is physically coupled to the mobile device by inserting the detachable electronic pen device into the mobile device.

6. A system, comprising:
a mobile device including a mobile wallet, the mobile wallet including payment card data, the payment card data including at least partially tokenized data; and
a detachable electronic pen device, removably attachable to the mobile device, the detachable electronic pen device comprising:
  a battery;
  a button configured to receive a user input;
  a wireless communication circuit;
  a memory storing payment card data associated with the mobile wallet of the mobile device, the payment card data including at least partially tokenized data; and
  at least one processor configured to:
    receive the payment card data from the mobile device,
    charge, in a docked mode, the battery using power received from the mobile device,
wherein the at least one processor, in a detached mode, is further configured to:
  transmit payment card data, in response to an interaction with the button of the detachable electronic pen device, directly to a point-of-sale (POS) device, via the wireless communication circuit of the detachable electronic pen device, to perform a transaction when the detachable electronic pen device is uncoupled from the mobile device, and
  transmit, in response to the transmitting of the payment card data to the POS device, location reporting and usage information indicating that the transaction is performed by the detachable electronic pen device, to the mobile device through the wireless communication circuit in the detached mode,
  wherein the location reporting includes a continent of the transaction, a state of the transaction, a county of the transaction, and/or a city of the transaction, and
  wherein both the detachable electronic pen device and the mobile device communicate payment card data of the mobile wallet to the POS device when the detachable electronic pen device is coupled to the mobile device.

7. The system of claim 6, wherein the detachable electronic pen device communicates payment card data to the POS device automatically when the payment device is within a threshold proximity of the POS device.

8. The system of claim 6, wherein the wireless communication circuit of the detachable electronic pen device is configured to perform short range wireless transmission using at least one of a Bluetooth communication protocol, a near-field communication (NFC) protocol, a magnetic secure transmission (MST) protocol, or a Wi-Fi Direct protocol.

9. The system of claim 6,
  wherein the detachable electronic pen device further comprises a fingerprint scanner, and
  wherein the transmitting of the payment card data directly to the POS device via the wireless communication circuit of the detachable electronic pen device is additionally in response to a user interaction with the fingerprint scanner.

10. The system of claim 6, wherein the payment card data includes at least one fully tokenized card data having a dynamic cryptogram.

11. The system of claim 6, wherein the detachable electronic pen device is physically coupled to the mobile device by inserting the detachable electronic pen device into the mobile device.

* * * * *